(12) United States Patent
Currans

(10) Patent No.: US 6,957,888 B1
(45) Date of Patent: Oct. 25, 2005

(54) SERIALIZED ORIGINAL PRINT

(75) Inventor: Kevin G. Currans, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1327 days.

(21) Appl. No.: 09/641,618

(22) Filed: Aug. 17, 2000

(51) Int. Cl.$^7$ .......................... B41J 2/01; B42D 15/00; H04N 1/32
(52) U.S. Cl. ........................................ 347/107; 283/74
(58) Field of Search .................. 347/19, 86, 105–107; 399/366; 283/74; 705/62, 408; 713/200; 358/438, 448, 450, 468, 530

(56) References Cited

U.S. PATENT DOCUMENTS

| | | | |
|---|---|---|---|
| 4,813,912 A | * 3/1989 | Chickneas et al. | 705/408 |
| 5,049,898 A | * 9/1991 | Arthur et al. | 347/19 |
| 5,276,467 A | 1/1994 | Meyer et al. | 347/19 |
| 5,289,208 A | 2/1994 | Haselby | 347/19 |
| 5,297,017 A | 3/1994 | Haselby et al. | 347/119 |
| 5,387,976 A | 2/1995 | Lesniak | 347/19 |
| 5,467,169 A | * 11/1995 | Morikawa | 399/366 |
| 5,532,825 A | 7/1996 | Lim et al. | 358/296 |
| 5,553,162 A | 9/1996 | Gaborski et al. | 382/192 |
| 5,861,619 A | 1/1999 | Horino et al. | 235/470 |
| 5,917,996 A | 6/1999 | Thorpe | 399/366 |
| 5,923,763 A | 7/1999 | Walker et al. | 380/51 |
| 5,974,548 A | 10/1999 | Adams | 713/200 |
| 6,011,905 A | 1/2000 | Huttenlocher et al. | 395/102 |
| 6,015,087 A | 1/2000 | Seifert et al. | 235/379 |

FOREIGN PATENT DOCUMENTS

| | | | |
|---|---|---|---|
| DE | 19535040 A1 | 3/1997 | B41L 47/36 |
| EP | 0629972 A2 | 12/1994 | G06K 15/02 |
| EP | 0858042 A2 | 8/1998 | G06F 17/30 |
| EP | 0940945 A2 | 9/1999 | H04L 9/32 |
| EP | 0961479 A2 | 12/1999 | H04N 1/32 |
| EP | 1008953 A2 | 6/2000 | G06T 1/00 |

OTHER PUBLICATIONS

PCT International Search Report mailed Jan. 22, 2002, PCT/US01/25495.

* cited by examiner

*Primary Examiner*—K. Feggins
*Assistant Examiner*—Julian D. Huffman

(57) ABSTRACT

The present invention provides a method, printer, system and software for verifying that a document was printed by a printer with a printing subsystem having a printhead cartridge with a unique printhead cartridge identifier and having a printhead electronically coupled to a computer. The method includes generating, by the computer, a unique document identification composite of electronic form characters utilizing the unique printhead cartridge identifier and transmitting the unique document identification composite to the printing subsystem for printing thereof on each print media sheet of the document.

48 Claims, 4 Drawing Sheets

SERIALIZED ORIGINAL PRINT

FIELD OF THE INVENTION

The present invention relates generally to security document printing and more particularly, to a system for providing a globally unique identifier that indicates an original document and may further identify copy numbers as well as providing for registration of a number of prints made of a document and providing for scars and registration marks that indicate whether a document is an original.

RELATED APPLICATIONS

The present application is related to two applications being concurrently filed: Ser. No. 10/001,688, by Kevin Currans titled "Document Delivery System With Automatically Adjusted Copy Inserts"; and Ser. No. 10/001,062, by Kevin Currans et al. titled "Method and Apparatus For Insuring Output Print Quality".

BACKGROUND OF THE INVENTION

The Internet permits rapid transmission of electronic documents to any computer that is coupled to the Internet system. Search engines allow a plurality of individual computer users to identify and access a large number of databases and electronic libraries. Such uncomplicated access to documents allows for exact duplication of the documents in an instantaneous manner.

In many instances it may be desirable to determine whether a document is an original document or, perhaps, where more than one copy of the document is printed, to determine which printed copy one has in-hand, i.e., whether it is a first printed copy, a second printed copy, etc. A variety of techniques have been used to identify an original document. In some cases, the line pitch or distance between certain lines in a document is altered slightly. However, this technique suffers from the limitation that, when a particular space is left between lines of the printed text of a form, the space for inserting information limits the amount of information that may be inserted.

Another way of discerning that a document is not the original is comparing the justification, typically a left justification, of the lines with the known justification for the printer from which the document is supposed to have originated. Clearly, the font may be compared also.

However, there is a need for a highly reliable method, printer and system for verifying that a document is an original printed document.

SUMMARY OF THE INVENTION

The present invention provides a method of verifying that a document was printed using a printer with a printing subsystem having a printhead cartridge with a unique printhead cartridge identifier and having a printhead electronically coupled to a computer. The method includes the steps of:

generating, by the computer, a unique document identification composite of electronic form characters utilizing the unique printhead cartridge identifier and transmitting the unique document identification composite to the printing subsystem for printing thereof on each print media sheet of the document. The steps may further include generating predetermined registration marks and transmitting the predetermined registration marks composite to the printing subsystem for printing thereof on each print media sheet of the document. Also, the steps may further include generating at least one predetermined scar/intentional aberration and transmitting the predetermined scar/intentional aberration composite to the printing subsystem for printing thereof on each print media sheet of the document.

The unique document identification composite typically includes a serial number of the unique printhead cartridge identifier, and where desired, the date and/or time the document is printed. The user may print the unique document identification composite on a back side, a front side, or both sides of the each print media sheet for the document. Where desired, the user may store the unique document identification composite in a storage medium. The unique document identification composite may be readable by humans, or alternatively, may be machine-readable. Additional copies of the document that are printed may have designations that indicate the number of the copy as well as the unique document identification composite. To further identify the original document, registration marks and/or printing aberrations/scars may be utilized.

The method may be implemented by a printer or a system having a printer computer that is arranged to operate as described above. The printer computer has verification software that causes the printer or system to implement the steps of the invention. Typically, the printer for printing a document that is verifiable as an original print document includes a printhead with a printhead cartridge (preferably ink but toner and thermal writing systems may be used) having a unique cartridge identifier, wherein the printhead is coupled to a controller that receives signals from a printer computer (in one embodiment this computer will be in the printer in the present invention, but the computer may be located outside the printer unit provided there is secure communication between the computer and the printer) that generates a unique document identification composite and sends signals to the controller to direct the printhead to print the unique document identification composite in accordance with a predetermined document identification composite positioning, and wherein each print media sheet for the document is further positioned by a platen motor that receives position control signals from a position controller coupled to the printer computer.

Where the method of the present invention is implemented by a system for verifying that a document is an original document, the system generally includes: a unique document identification composite generating system of a printer computer, wherein the printer computer is coupled to a drop-firing controller and a position controller, for generating a unique document identification composite of electronic form characters utilizing the unique printhead cartridge identifier and sending print signals to the drop-firing controller to initiate control signals for printing of the unique document identification composite and the printer computer generates position control signals to the position controller in accordance with predetermined document identification composite positioning; the drop-firing controller, coupled to a printhead, for transmitting print signals for the unique document identification composite to a printhead; the printhead coupled to the drop-firing controller, a power supply and a carriage motor, for printing of the unique document identification composite on each print media sheet of the document; the carriage motor, coupled to the position controller, for positioning the printhead in accordance with signals from the position controller; and the position controller, coupled to a platen motor, the carriage motor and the printer computer, for, in response to the position control signals, controlling the platen motor and the carriage motor to position each print media sheet of the document in accordance with the predetermined document identification composite positioning. Thus, the method may be implemented by computer-executable instructions. Typically, the computer-executable instructions are stored in a computer medium.

DETAILED DESCRIPTION OF THE PREFERRED EMBODIMENTS

Figure 1:
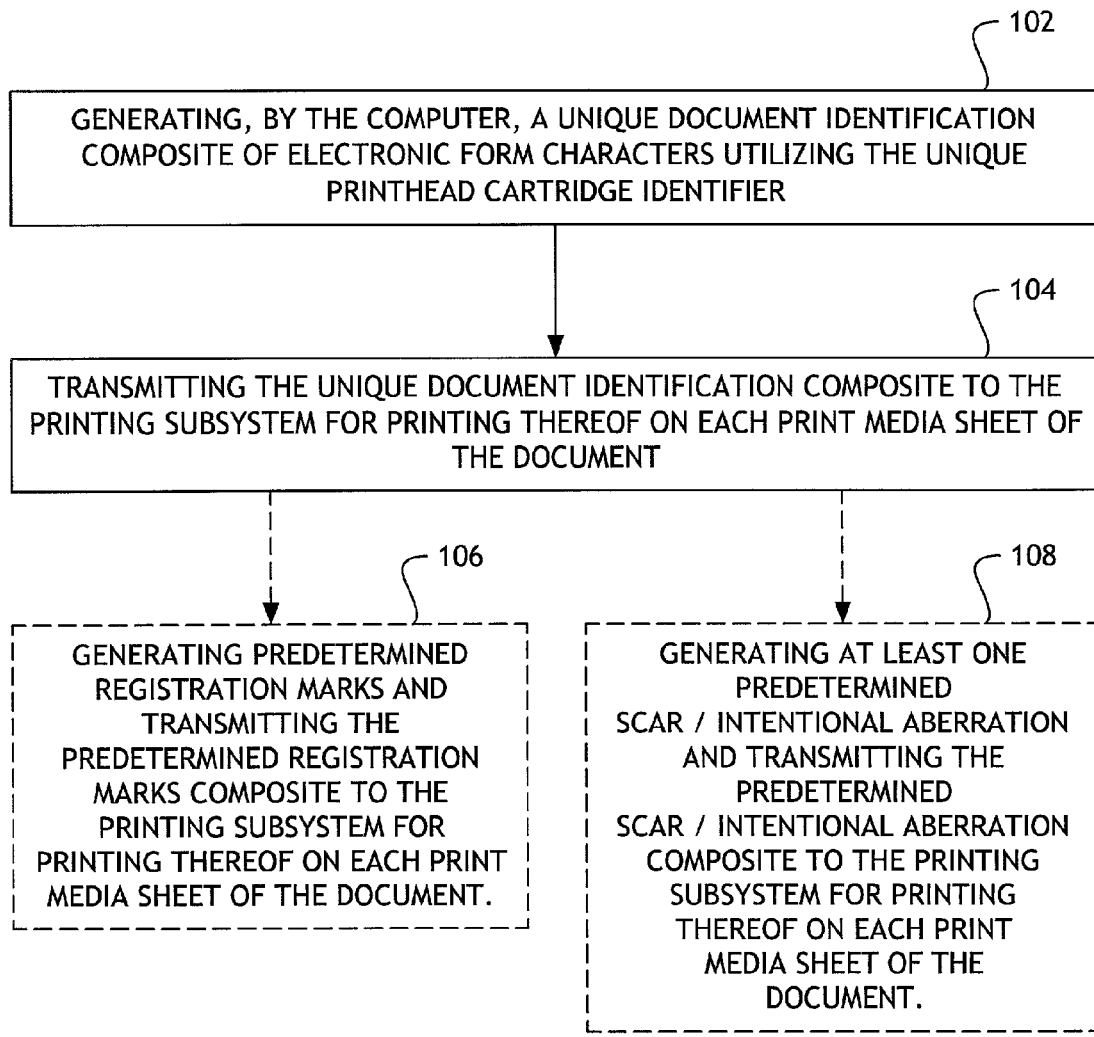
FIG. 1 is a flow chart showing one embodiment of steps in accordance with the method of the present invention.

The present invention provides a method, printer and system for verification that a document was printed by a particular printer and also, where desired, may provide verification marking for each original printed copy of the document. The method provides for verifying that a document was printed using a printer with a printing subsystem having a printhead cartridge with a unique printhead cartridge identifier and having a printhead electronically coupled to a computer. As shown in the flow chart of FIG. 1, one embodiment of a method in accordance with the present invention includes the steps of: generating 102, by the computer, a unique document identification composite of electronic form characters utilizing the unique printhead cartridge identifier and transmitting 104 the unique document identification composite to the printing subsystem for printing thereof on each print media sheet of the document. Where desired, the steps may further include generating predetermined registration marks 106 and transmitting the predetermined registration marks composite to the printing subsystem for printing thereof on each print media sheet of the document. Also, where desired, the steps may further include generating at least one predetermined scar/intentional aberration 108 and transmitting the predetermined scar/intentional aberration composite to the printing subsystem for printing thereof on each print media sheet of the document.

In one embodiment, the unique document identification composite may include at least a serial number of the unique printhead cartridge identifier and may be generated as is known in the art. In addition, the unique document identification composite may include a date that the document is printed and/or a time that the document is printed. Clearly, the unique document identification composite may be composed of any desired identifiable components. The composite may be printed on the front side, the back side or both sides of the document. In a preferred embodiment, the unique identification composite is printed on the print media sheet prior to printing the content. Where desired, the unique document identification composite may be stored in a storage medium. In certain embodiments, the user may select the unique document identification composite that may be read by humans. Alternatively, or in combination with the human-readable composite, a machine-readable unique document identification composite may be implemented. For example, a bar-scannable, or any other desired machine-readable unique document identification composite may be used.

In addition, where desired, the composite may include a designation that indicates which copy of the document was printed. For example, an original print of the document may be given a unique document identification composite of:

00000010-0000-0010-8000-00AA006D2EA (in addition, individual characters may be of different colors, thus encoding the visual data even more).

Figure 4:
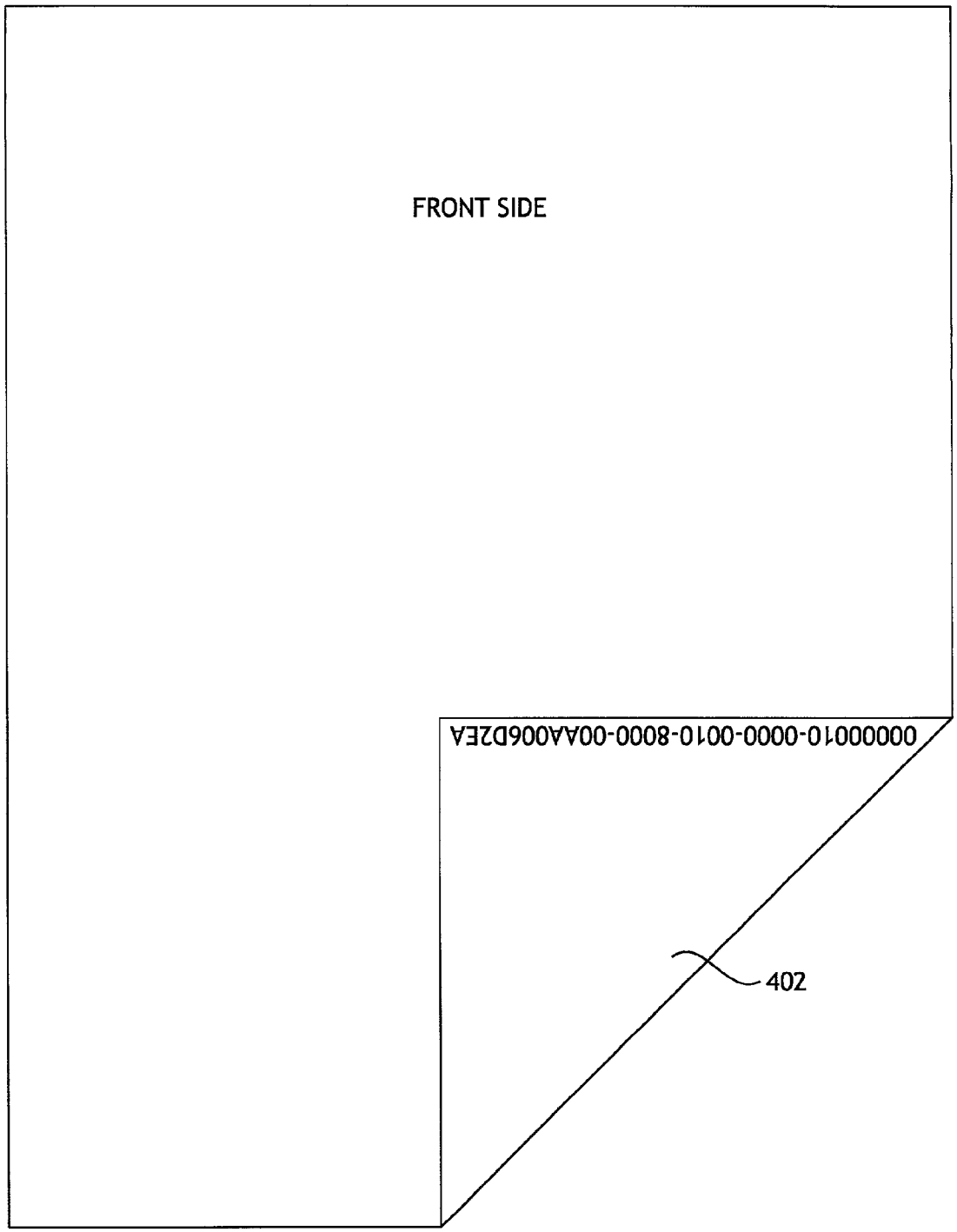
FIG. 4 is a schematic representation illustrating a unique document identification composite printed on a back side of a document in accordance with the present invention.

In one embodiment, a first copy may be designated 00000010-0000-0010-8000-00AA006D2EA.1, a second copy may be designated 00000010-0000-0010-8000-00AA006D2EA.2, and so forth. Thus, the unique document identification composite may be a unique serial number so that, for example, as shown in FIG. 4, when a user photocopied or faxed the original to another, a corner 402 could be folded over to show the unique serial number as verification that a facsimile of the original document was being transmitted. Clearly, succeeding copies may be designated by Arabic numerals, Roman numerals, character/characters of an alphabet, or any desired designation.

In a preferred embodiment, each Page or Printed UID increments a counter in the RAM, and a Next request to print a Serialized Original Print will result in a number (UID) that changes to reflect the next print.

It is not essential that the "Date/Time" be different to print a new number.

For Instance, the copies 2, 3, 4 . . . will all be printed after 1 but the UID will be the same for the request. For a multi-copy printing system, when jobs may be printing at the same point in time, they then need to identify each print job within the printer/printing system.

The "Printers Serial number" and Manufacture and Model number will be included in the UID encoding, so "Printed qualities" can be compared when looking for counterfeits. The UID contains critical information on the writing system and its known aberration when printing.

The requesting Print request can supply information (such as JOB ID) that will be included in the UID; thus the UID number will have a meaning for the users requesting the print. For example, for the UID given in the example above:

00000010-0000-0010-8000-00AA006D2EA a JOB ID may be 00000010 for job# 10 from the computer that was requesting the print. The printer (or controller in the printer) generates the rest of the UID. Where desired, the UID may be selected to include one or more of: a serial number of the unique printhead cartridge identifier, a model number, a company that is printing the docunent, and a media on which the document is being printed.

Where selected, registration marks identifiable with the printhead cartridge may be printed on a front side, a back side, or both sides of each print media sheet. Registration marks are typically printed on both sides of a document page such that, when held up to a light, the registration marks would align, so that, together with an intentional scars, the registration marks would be proof of the originality of the page. The HP 970 places registration marks accurately by using a photo-scanner to sense the position of the paper after it is tumbled for duplexing media registration. The printer used for printing registration marks may be, for example, an ink jet printer such as the HP 970 or any other printer that is capable of accurately positioning registration marks.

Further, aberrations or "scars" may be printed which are identifiable under magnification. An aberration may, for example, be a predefined spacing between lines, words or the like, that enables differentiation of documents. For example, the HP 970 made by Hewlett Packard has a printhead positioning mechanism that can sense the edge of the paper and position itself within 1/1200 of an inch and print a "scar". Since the HP 970 can also print on the edge of the paper and edge marks are often clipped by photocopiers or other copying device, the edge marks may be used to aid in identification of original documents. Typically, such a scar can only be seen under magnification. "Scars" may, for example, be a space between a horizontal and vertical line, or periods which are actually small stars, but which, when photocopied, appear as periods, i.e., a photocopier does not have the capability to reproduce the aberrations without damaging them. Again, these aberrations or "scars" may be printed on a front side, a back side, or both sides of each print media sheet.

Thus, the present invention may be implemented by software that marks original prints. The software directs the printer to print a scar (anti-counterfeiting), intentional aberration, on a page. The scar is undetectable to a typical photocopier or other copying device. The software also causes a unique document identification composite to be printed on at least one side of the document page/print media sheet. There may also be alignment marks on the front and back of the document page to facilitate differentiating the original document from a copy of the original document. The printer is set to allow each serial number/composite to be used only once, typically by use of a small flash RAM in the printer that is not resetable.

Figure 2:
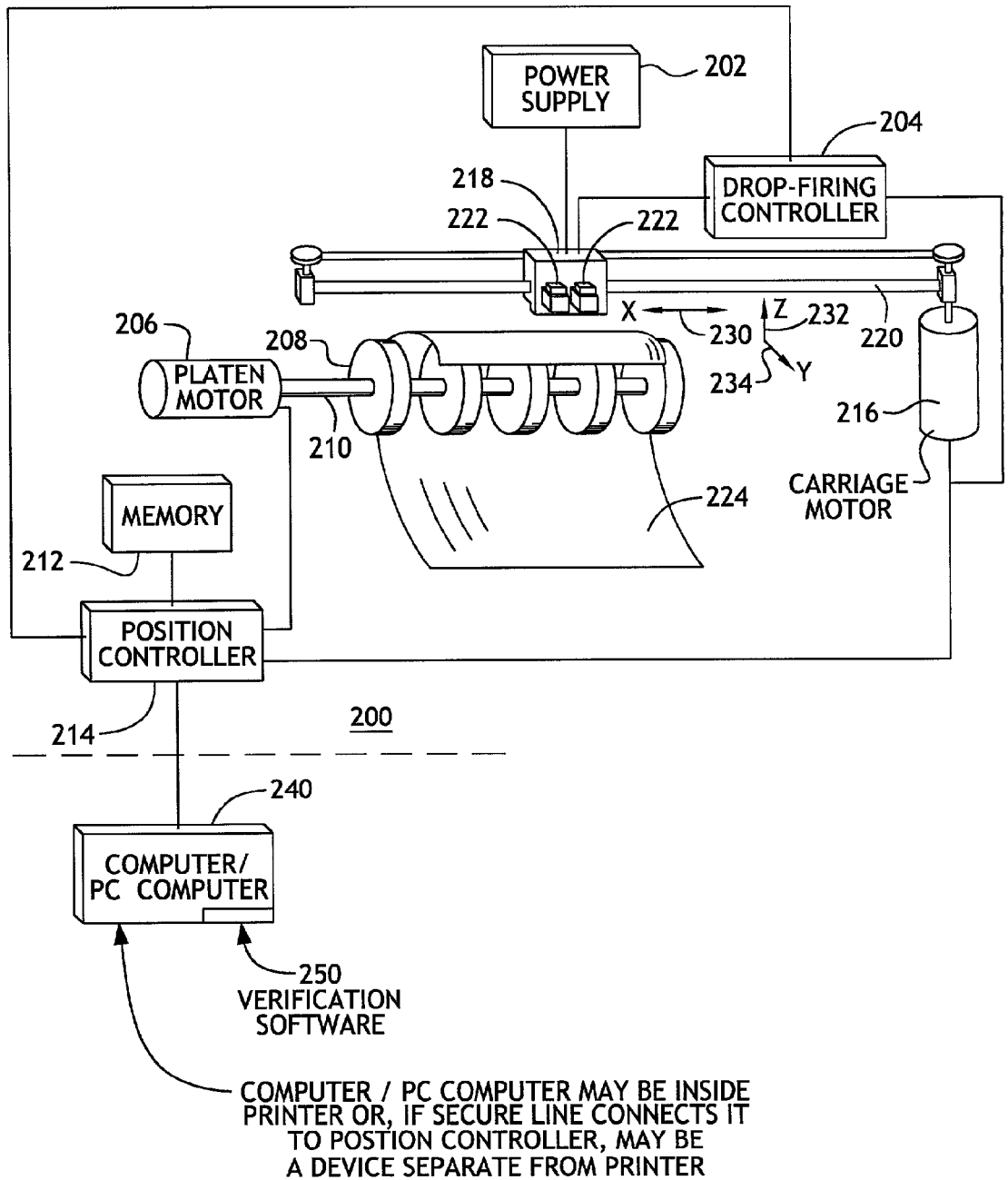
FIG. 2 is a schematic representation of one embodiment of a printer for implementing the method of the present invention.

FIG. 2 is a block diagram of one embodiment of an inkjet printer/system 200 that may be utilized to implement the present invention. Inkjet printer 200 includes a power supply 202, a drop firing controller 204 that includes a processor, preferably a microcontroller or a microprocessor, a platen motor 206, at least one roller 208 coupled to platen motor 206 by a roller bar 210, a memory (which includes RAM) 212, a position controller 214 coupled to memory 212 and platen motor 206, and a carriage motor 216 coupled to position controller 214, all of which are preferably under the control of a computer 240 that preferably includes a microprocessor. The inkjet printer 200 further includes a carriage 218 coupled to power supply 202 and drop firing controller 204, which carriage 218 includes at least one print cartridge 222. Carriage 218 is mounted on a slide bar, allowing the carriage 218 to be reciprocated or scanned back and forth across a print media 224, such as paper, by carriage motor 216. The scan axis, X, is indicated by arrow 230. Platen motor 206 and carriage motor 216 are under the control of the position controller 214, which controller 214 may be implemented in a conventional hardware configuration and provided operating instructions from memory 212. As the carriage 218 scans, ink drops are selectively ejected from each print cartridge 222 onto a print media sheet 224 in predetermined print swath patterns, forming images or alphanumeric characters using dot matrix manipulation. The ink drop trajectory axis, Z, is indicated by arrow 232. The dot matrix manipulation is determined by computer 240, which computer 240 transmits instructions to the drop firing controller 204 and power supply 202. When a swath of print has been completed, media 224 is advanced an appropriate distance along the print media axis, Y, indicated by arrow 234, by platen motor 206 and roller 208 in preparation for the printing of the next swath.

The present invention includes a printer for printing a document that is verifiable as an original print document wherein the printer includes a printhead with an printhead cartridge having a unique printhead cartridge identifier, wherein the printhead is coupled to a controller that receives signals from a printer computer that generates a unique document identification composite and sends signals to the controller to direct the printhead to print the unique document identification composite in accordance with a predetermined document identification composite positioning, and wherein each print media sheet for the document is further positioned by a platen motor that receives position control signals from a position controller coupled to the printer computer.

Figure 3:
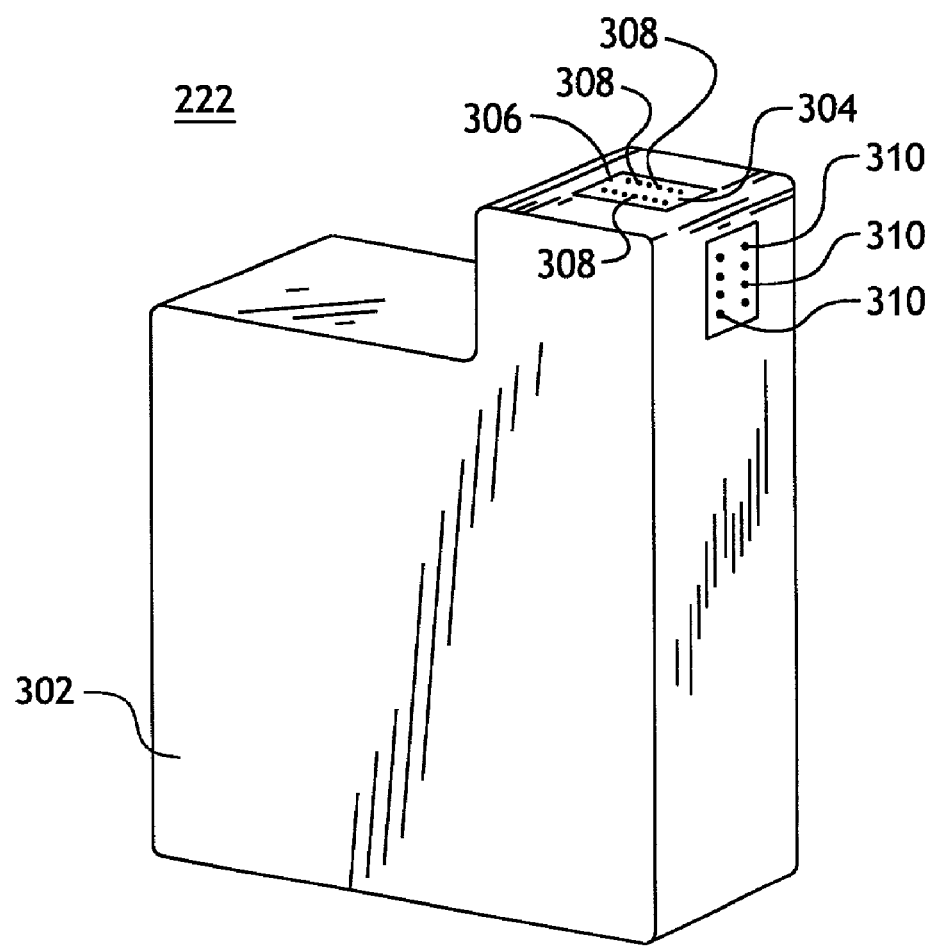
FIG. 3 is a schematic representation of a printhead that may be used in the printer of FIG. 2 in accordance with the present invention.

The unique document identification composite typically includes a serial number of the unique printhead cartridge identifier, allowing identification of which printer printed a document. Further variations of the unique document identification composite are described above. Registration marks and scars may also be printed on the document, as described more fully above. FIG. 3 is a schematic representation of a printhead that may be used in the printer of FIG. 2 in accordance with the present invention. A cartridge housing, or shell, 302 contains an internal reservoir of ink (not shown); however, in an alternative embodiment, print cartridge 322 includes at least one small volume, on-board, ink chamber that is sporadically replenished from fluidically-coupled, off-axis, ink reservoirs (not shown). Print cartridge 222 is provided with a printhead 304 with a plate 306 having multiple apertures, or nozzles 308, constructed in combination with subjacent firing chambers and structures, and electrical contacts 310 for coupling to printer 200. Each nozzle 308 is a part of an ink drop generator that is found within printhead 304. Typically, multiple nozzles 308 are arranged in a predetermined pattern so that the ink expelled from the nozzles 308 is capable of creating multiple characters or images of print on a print media sheet 224.

As shown in FIGS. 2 and 3, the present invention may be implemented by a system for verifying that an original document was printed using a specified printer, the system having a printing subsystem with a printhead cartridge with a unique printhead cartridge identifier and having a printhead electronically coupled to a computer. The printing subsystem includes a unique document identification composite generating system of a printer computer 240, wherein the printer computer 240 is coupled to a drop-firing controller 204 and a position controller 214, for generating a unique document identification composite of electronic form characters utilizing the unique printhead cartridge identifier and sending print signals to the drop-firing controller 204 to initiate control signals for printing of the unique document identification composite and the printer computer 240 generates position control signals to the position controller 214 in accordance with predetermined document identification composite positioning. The printer computer 240 has loaded thereon computer-executable instructions (Verification Software 250) for providing for verification that an original document was printed using a specified printer by performing the steps of: generating, by the computer, a unique document identification composite of electronic form characters utilizing the unique printhead cartridge identifier and transmitting the unique document identification composite to the printing subsystem for printing thereof on each print media sheet of the document. The drop-firing controller 204 is coupled to a printhead 304 and is used for transmitting print signals for the unique document identification composite to a printhead 304. The printhead 304 is coupled to the drop-firing controller 204, a power supply 202 and a carriage motor 216 and is used for printing of the unique document identification composite on each print media sheet of the document. The carriage motor 216 is coupled to the position controller 214 and is used for positioning the printhead 304 in accordance with signals from the position controller 214.

The position controller 214 is coupled to a platen motor 206, the carriage motor 216 and the printer computer 240, for, in response to the position control signals, controlling the platen motor 206 and the carriage motor 216 to position each print media sheet of the document in accordance with the predetermined document identification composite positioning.

The Verification Software 250 controls generating a unique document identification composite for each document and may also, where desired, provide for generating registration marks and/or scars. The unique document identification composite, registration marks and/or scars are as described above.

Clearly, the present invention may be implemented by loading instructions from a computer medium having the steps of the method of the invention into the printer computer.

Although the present invention has been described in relation to particular preferred embodiments thereof, many variations, equivalents, modifications and other uses will become apparent to those skilled in the art. The present invention is intended to cover any variations, equivalents, modifications and other such uses that follow the principles of the invention, including such departures from the present disclosure as come within known and customary practice within the art to which the invention pertains. It is preferred, therefore, that the present invention be limited not by the specific disclosure herein, but only by the appended claims, and that the present invention shall include any variations, equivalents, modifications and other such uses that follow the principles of the invention, including such departures from the present disclosure as come within known and customary practice within the art to which the invention pertains.

What is claimed is:

1. A method of verifying that a document was printed using a printer with a printing subsystem having an inkjet a printhead cartridge with a unique printhead cartridge identifier and having a printhead electronically coupled to a computer, comprising the steps of:
    generating, by the computer, a unique document identification composite of electronic form characters utilizing the unique printhead cartridge identifier; and
    transmitting the unique document identification composite to the printing subsystem for printing thereof on each print media sheet of the document.

2. The method of claim 1 wherein the unique document identification composite includes at least one of: a serial number of the unique printhead cartridge identifier, a model number, a company that is printing the document, and a type of media on which the document is being printed.

3. The method of claim 1 wherein the unique document identification composite includes a date that the document is printed.

4. The method of claim 1 wherein the unique document identification composite includes a time that the document is printed.

5. The method of claim 1 further including printing the unique document identification composite on a back side of the each print media sheet for the document.

6. The method of claim 1 further including printing the unique document identification composite on a front side of the each print media sheet for the document.

7. The method of claim 1 further including printing the unique document identification composite on a front side and a back side of the each print media sheet for the document.

8. The method of claim 1 wherein the unique document identification composite is stored in a storage medium or memory.

9. The method of claim 1 wherein the unique document identification composite is readable by humans.

10. The method of claim 1 wherein the unique document identification composite is machine readable.

11. The method of claim 1 wherein the unique document identification composite includes, for printing each additional copy of the document, a designation of a copy number on each print media sheet of the copy of the document.

12. The method of claim 11 wherein the designation of the copy number is at least one of:
    a number, a character of an alphabet, a Roman numeral, and a combination of individual characters of different colors.

13. The method of claim 1, further including printing registration marks identifiable with the printhead cartridge on at least one of: a front side and a back side of each print media sheet.

14. The method of claim 1, further including printing aberrations or scars that are identifiable under magnification on at least one of: a front side and a back side of each print media sheet.

15. The method of claim 14 wherein the aberrations or scars are irreproducible without damage by conventional document copying devices.

16. A printer for printing a document that is verifiable as an original print document wherein the printer includes a printhead with an inkjet a printhead cartridge having a unique printhead cartridge identifier, wherein the printhead is coupled to a controller that receives signals from a printer computer that generates a unique document identification composite utilizing the unique printhead cartridge identifier and sends signals to the controller to direct the printhead to print the unique document identification composite in accordance with a predetermined document identification composite positioning, and wherein each print media sheet for the document is further positioned by a platen motor that receives position control signals from a position controller coupled to the printer computer.

17. The printer of claim 16 wherein the unique document identification composite includes at least one of: a serial number of the unique printhead cartridge identifier, a model number, a company that is printing the document, and type of a media on which the document is being printed.

18. The printer of claim 16 wherein the unique document identification composite includes a date that the document is printed.

19. The printer of claim 16 wherein the unique document identification composite includes a time that the document is printed.

20. The printer of claim 16 wherein the unique document identification composite is printed on a back side of the each print media sheet for the document.

21. The printer of claim 16 wherein the unique document identification composite is printed on a front side of the each print media sheet for the document.

22. The printer of claim 16 wherein the unique document identification composite is printed on a front side and a back side of the each print media sheet for the document.

23. The printer of claim 16 wherein the unique document identification composite is stored in a storage medium or memory coupled to or within the computer.

24. The printer of claim 16 wherein the unique document identification composite is readable by humans.

25. The printer of claim 16 wherein the unique document identification composite is machine readable.

26. The printer of claim 16 wherein the unique document identification composite includes, for printing each additional copy of the document, a designation of a copy number on each print media sheet of the copy of the document.

27. The printer of claim 26 wherein the designation of the copy number is at least one of:
a number, a character of an alphabet, a Roman numeral, and a combination of individual characters of different colors.

28. The printer of claim 16, wherein the unique document identification composite includes registration marks identifiable with the printhead cartridge and the registration marks are printed on at least one of: a front side and a back side of each print media sheet.

29. The printer of claim 16, wherein the unique document identification composite includes aberrations or scars that are identifiable under magnification and the aberrations or scars are printed on at least one of: a front side and a back side of each print media sheet.

30. The printer of claim 29 wherein the aberrations or scars are irreproducible without damage by conventional document copying devices.

31. A system for verifying that an original document was printed using a specified printer, the system having a printing subsystem with a printhead cartridge with a unique printhead cartridge identifier and having a printhead electronically coupled to a computer, the printing subsystem comprising:
a unique document identification composite generating system of a printer computer, wherein the printer computer is coupled to a drop-firing controller and a position controller, for generating a unique document identification composite of electronic form characters utilizing the unique printhead cartridge identifier and sending print signals to the drop-firing controller to initiate control signals for printing of the unique document identification composite and the printer computer generates position control signals to the position controller in accordance with predetermined document identification composite positioning;
wherein the drop-firing controller is, coupled to a printhead and is, for transmitting print signals for the unique document identification composite to the printhead;
wherein the printhead is coupled to the drop-firing controller, a power supply and a carriage motor and is, for printing of the unique document identification composite on each print media sheet of the document;
wherein the carriage motor is, coupled to the position controller and is, for positioning the printhead in accordance with signals from the position controller; and
wherein the position controller is, coupled to a platen motor, the carriage motor and the printer computer, and is for, in response to the position control signals, controlling the platen motor and the carriage motor to position each print media sheet of the document in accordance with the predetermined document identification composite positioning.

32. The system of claim 31 wherein the unique document identification composite includes at least one of: a serial number of the unique printhead cartridge identifier, a model number, a company that is printing the document, and a type of media on which the document is being printed.

33. The system of claim 31 wherein the unique document identification composite includes a date that the document is printed.

34. The system of claim 31 wherein the unique document identification composite includes a time that the document is printed.

35. The system of claim 31 wherein the unique document identification composite is printed on a back side of the each print media sheet for the document.

36. The system of claim 31 wherein the unique document identification composite is printed on a front side of the each print media sheet for the document.

37. The system of claim 31 wherein the unique document identification composite is printed on a front side and a back side of the each print media sheet for the document.

38. The system of claim 31 wherein the unique document identification composite is stored in a storage medium or memory.

39. The system of claim 31 wherein the unique document identification composite is readable by humans.

40. The system of claim 31 wherein the unique document identification composite is machine readable.

41. The system of claim 31 wherein the unique document identification composite includes, for printing each additional copy of the document, a designation of a copy number on each print media sheet of the copy of the document.

42. The system of claim 41 wherein the designation of the copy number is at least one of:
a number, a character of an alphabet, a Roman numeral, and a combination of individual characters of different colors.

43. The system of claim 31 wherein the unique document identification composite generating system further includes registration marks identifiable with the printhead cartridge that are printed on at least one of: a front side and a back side of each print media sheet.

44. The system of claim 31 wherein the unique document identification composite generating system further includes aberrations or scars that are identifiable under magnification and are printed on at least one of: a front side and a back side of each print media sheet.

45. The system of claim 44 wherein the aberrations or scars are irreproducible without damage by conventional document copying devices.

46. A computer-readable medium having computer-executable instructions for providing for verification that an original document was printed using a specified printer by performing the steps of:
generating, by the computer, a unique document identification composite of electronic form characters utilizing a unique inkjet printhead cartridge identifier; and
transmitting the unique document identification composite to the printing subsystem for printing thereof on each print media sheet of the document.

47. The computer-readable medium of claim 46 wherein the steps further include generating predetermined registration marks and transmitting the predetermined registration marks composite to the printing subsystem for printing thereof on each print media sheet of the document.

48. The computer-readable medium of claim 46 wherein the steps further include generating at least one predetermined scar or intentional aberration and transmitting the predetermined scar or intentional aberration composite to the printing subsystem for printing thereof on each print media sheet of the document.

* * * * *